United States Patent [19]

Van Paesschen et al.

[11] 3,988,157

[45] Oct. 26, 1976

[54] PROCESS FOR ADHERING HYDROPHILIC LAYERS TO DIMENSIONALLY STABLE POLYESTER FILMS

[75] Inventors: August Jean Van Paesschen, Antwerp; Lucien Janbaptist Van Gossum, Kontich, both of Belgium

[73] Assignee: AGFA-GEVAERT N.V., Mortsel, Belgium

[22] Filed: June 3, 1975

[21] Appl. No.: 583,205

Related U.S. Application Data

[63] Continuation of Ser. No. 379,485, July 16, 1973, abandoned.

[30] Foreign Application Priority Data

July 17, 1972 United Kingdom............... 33295/72

[52] U.S. Cl. .............................. 96/87 R; 427/171; 427/385 R; 427/407 R; 427/414
[51] Int. Cl.$^2$ ...................... G03C 1/78; G03C 1/96
[58] Field of Search ...................... 96/87 R; 117/34; 427/171, 385, 407, 414

[56] References Cited
UNITED STATES PATENTS

| | | | |
|---|---|---|---|
| 3,353,958 | 11/1967 | Moede | 96/87 R |
| 3,545,972 | 12/1970 | D'Cruz | 96/87 R |
| 3,586,508 | 6/1971 | Fowler, Jr. et al. | 96/87 R |
| 3,589,905 | 6/1971 | Reedy et al. | 96/87 R |
| 3,607,345 | 9/1971 | Thomas et al. | 96/85 |
| 3,674,531 | 7/1972 | Shephard et al. | 96/87 R |

*Primary Examiner*—Jack P. Brammer
*Attorney, Agent, or Firm*—William J. Daniel

[57] ABSTRACT

Hydrophilic layers are made to adhere to dimensionally stable polyester film supports by applying to an unstretched or only longitudinally stretched polyester film an adhesive layer from an aqueous coating composition comprising a chlorine-containing copolymer formed of 45 to 99.5 % by weight of at least one of the monomers vinylidene chloride and vinyl chloride, 0.5 to 10 % by weight of an ethylenically unsaturated mono- or dicarboxylic acid or of N-vinyl pyrrolidone, and 0 to 54.5 % by weight of at least one monomer taken from acrylamides, methacrylamides, esters of acrylic acid, methacrylic acid and maleic acid, and N-alkyl maleimides. Immediately thereafter, without drying of the adhesive layer, a subbing layer is applied thereto from an aqueous gelatin solution comprising a plasticizer for the gelatin. After drying of the two layers, they are biaxially or transversally stretched together with the polyester film support, and heatsetted. Finally a hydrophilic layer is applied to the subbing layer.

The polyester film may be a film of polyethylene terephthalate and the hydrophilic layer applied to the subbing layer may be a light-sensitive gelatin silver halide emulsion layer.

6 Claims, No Drawings

PROCESS FOR ADHERING HYDROPHILIC LAYERS TO DIMENSIONALLY STABLE POLYESTER FILMS

This is a continuation of Ser. No. 379,485, filed July 16, 1973, now abandoned.

This invention relates to a process for adhering hydrophilic layers to dimensionally stable polyester film supports, especially to the adhering of hydrophilic photographic layers to films of dimensionally stable polyethylene terephthalate and to the composite films and photographic materials thus obtained.

In order to give a sufficient dimensional stability to the polyester film support it is necessary, as is generally known, to orient the film biaxially and to heat-set it at relatively high temperature. This biaxial orienting can be performed by subjecting the film simultaneously to a longitudinal and a transversal stretching, usually, however, by stretching the film first in one direction and afterwards in a direction perpendicular to the first. In practice, the longitudinal stretching is carried out first. This stretching of the film up to 3 to 5 times the original dimensions is performed at a temperature comprised between the glass transition temperature and the softening temperature of the polyester. In the case of films of polyethylene terephthalate the stretching is performed usually between 80° and 90° C.

After the biaxial stretching the film is conducted through a heat-setting zone wherein the film is heated until a temperature between 180° and 220° C is reached, the film being kept under tension in both directions. In this way a dimensionally stable fully clear polyester film is obtained.

In order to ensure a perfect adhesion of hydrophilic layers, such as photograhic light-sensitive emulsion layers, to dimensionally stable polyester film supports, i.e. polyester films that have been stretched biaxially and heat-set, several known intermediate layers can be applied between the support and the light-sensitive emulsion layer. In most cases two intermediate layers are needed. A first one, the adhesive layer, has a good adhesion to the polyester film support and at the same time has favourable attaching properties in respect of the second layer, i.e. the subbing layer, which usually is composed to a great extent of a hydrophilic colloid such as gelatin. This subbing layer is responsible for the good adhesion of hydrophilic layers, e.g. light-sensitive gelatin-containing layers that are applied to the subbing layer.

The method applied usually so far for the coating of the above-mentioned two layers comprises the application of an aqueous solution or dispersion between the longitudinal stretching and the transversal stretching of the polyester support to form the adhesive layer and the application of the gelatin-containing subbing layer, after the film support, together with the adhesive layer, have been stretched transversally and heat-set.

According to the invention a process is provided for adhering hydrophilic layers to dimensionally stable polyester film supports, which process comprises applying to an unstretched or only longitudinally stretched polyester film support an adhesive layer from an aqueous coating composition comprising a polymeric substance as defined hereinafter, and without drying of said adhesive layer immediately applying thereto an aqueous gelatin solution, drying both layers and stretching them biaxially or transversally together with the polyester film support and heat-setting them.

The polymeric substance used to form the adhesive layer according to the invention can be selected from the copolymers described in the United Kingdom patent specification No. 1,234,755 filed Sept. 28, 1967 by Gevaert-Agfa N.V. In the latter specification copolymers are described, which contain 45 to 99.5% by weight of vinylidene chloride and/or vinyl chloride, 0.5 to 10% by weight of an ethylenically unsaturated mono- or dicarboxylic acid or of N-vinylpyrrolidone, and 0 to 54.5% by weight of at least one copolymerisable monomer such as acrylamides, methacrylamides, esters of acrylic acid, methacrylic acid and maleic acid, and N-alkyl maleimides.

Suitable hydrophobic polymeric substances are also copolymers of vinylidene, an acrylic ester including acrylonitrile and itaconic acid, such as described in the United Kingdon patent specification Nos. 688,528 filed Sept. 17, 1951 and 718,422 filed Feb. 13, 1951 both by Du Pont de Nemours Co. Equally suitable are the copolymers of vinylidene chloride, an alkyl acrylate, and an unsaturated organic acid, which are applied after treatment of the polyester surface with an aqueous solution of an oxidizing agent such as described in the U.S. Pat. No. 2,934,937 of Lucius L. Bennett, issued May 3, 1960 and those described in the printed German Patent Application No. 2,105,527 filed Feb. 5, 1971 by Imperial Chemical Industries, which are copolymers of a conjugated diolefin with one or more vinyl monomers, a polymer of copolymer of a halogenated vinyl ester or of a vinyl cyanoester, and copolymers containing at least 35 mole % of vinylidene chloride.

Examples of suitable polymeric substances that may be used to form the adhesive layer according to the invention are e.g.:

copolymers of vinyl chloride, vinylidene chloride, N-tert.butyl-acrylamide, and itaconic acid (50:30:18:2 % by weight)

copolymers of vinyl chloride, vinylidene chloride, n-butyl acrylate, and itaconic acid (63:30:5:2 % by weight)

copolymers of vinylidene chloride, N-tert.butyl-acrylamide, n-butyl acrylate, and N-vinyl-pyrrolidone (70:23:3:4 % by weight)

copolymers of vinylidene chloride, N-tert.butyl-acrylamide, versatic acid vinyl ester, and itaconic acid (75:12:10:3 % by weight), wherein versatic acid vinyl ester is the compound sold by Shell Chemical Co. under the trade name VEOVA 10, and is a branched chain vinyl carboxylic acid ester having a molecular weight of 198 and corresponds to the formula:

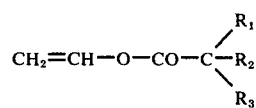

wherein $R_1$, $R_2$, and $R_3$ are alkyl groups having together from 7 to 9 carbon atoms, and wherein only one of $R_1$, $R_2$, and $R_3$ is a methyl group.

These copolymers can be prepared by known emulsion polymerisation techniques, so that the primary dispersion obtained upon copolymerisation can be used directly to coat the adhesive layer on the polyester film support.

To the coating composition of the adhesive layer can be added the known aids such as dispersing agents, spreading agents and thickening agents, which in general are highly viscous water-soluble polymers having as sole object to adapt the viscosity of the coating composition to the desired degree e.g. carboxymethyl-cellulose, gelatin, copolymers of methylacrylic acid with an alkyl (meth)acrylate and polyvinyl alcohol. A survey of the thickening of latices and of the thickening agents that may be used has been given by Houben-Weyl in "Methoden der organischen Chemie," Makromolekulare Stoffe, Vol. 14/1, pages 519 and 536, Georg Thieme Verlag, Stuttgart (1961).

The thickness of the adhesive layer before the stretching of the support may vary between 0.2 and 10 micron, but preferably between 0.5 and 2 micron. These values obtain in the hypothetical case in which the adhesive layer would have been applied and dried alone without applying the subbing layer.

It has been found that with a coating composition for the adhesive layer as defined hereinbefore it is unnecessary to treat the surface of the film before the application of the adhesive layer, e.g. with an oxidizing agent or a solvent. Of course, if desired such adhesion-improving agents can be added to the coating composition of the adhesive layer e.g. resorcinol, pyrocatechol, dihydroxytoluene, p-methylene hydroxybenzoic acid, and chloral hydrate.

Immediately after the coating of the aqueous coating composition for the adhesive layer and without drying, an aqueous gelatin solution is applied thereto, so that a layer is obtained, which has a thickness varying between 0.2 and 10 micron, preferably between 0.5 and 2 micron. In much the same way as for the adhesive layer these values only obtain in the hypothetical case in which the subbing layer would have been coated alone and dried without adhesive layer.

Plasticizers for the gelatin can be added to the aqueous gelatin coating composition. Plasticizers are compounds that are soluble or dispersible in water, that are photographically inert, and that have the property of making gelatinous layers stretchable, these layers after having been stretched and heat-set at relatively high temperatures remaining fully clear and transparent.

Suitable plasticizers are aliphatic polyhydroxy compounds such as glycerol, tri($\beta$-hydroxyethyl)glycerol, 1,1,1-tri-(hydroxymethyl)propane, 2-nitro-2-ethyl-1,3-propanediol, 1,3-dichloro-2-propanol, 1,2,4-butanetriol, 3-hydroxymethyl-2,4-dihydroxypentane, 1,2,6-hexanetriol, 2-hydroxymethyl-4-hydroxy-amyl alcohol, glycerol-aldehyde, glycerol dichlorohydrin, and mannitol.

Equally suitable compounds are caprolactam, N,N'-dimethylurea, resorcinol, pyrocatechol, and dichlorodiethyl ether. Other suitable plasticizers are aliphatic carboxylic or sulphonic acids such as glutaric acid, adipic acid, azelaic acid, sebacic acid, mono- and di-chloro-acetic acid, 1,2,3-propene-tricarboxylic acid, trimellitic acid, acrylic acid, methacrylic acid, maleic acid, fumaric acid, itaconic acid, and 2-sulpho-ethyl methacrylate; further aromatic acids such as phthalic acid, o-sulphobenzoic acid, o-nitrobenzoic acid, o-aminobenzoic acid, p-hydroxybenzoic acid, and salicylic acid.

Moreover, polymeric plasticizers can be added to the gelatin coating composition, e.g. latices of copolymers of butadiene and a lower alkyl ester of acrylic or methacrylic acid e.g. a copolymer of butadiene and methyl methacrylate containing 20–80 % by weight of methyl methacrylate. These latices have been described in the United Kingdom patent specification No. 1,053,043 filed Jan. 23, 1964 by Gevaert Photo-Producten N.V.

Hardening agents, spreading agents, antistatic or metal-complexing agents can also be added to the aqueous gelatin-contianing coating compositions. Suitable antistatic or metal complexing agents are the sodium salt of polystyrene sulphonic acid, alkali metal salts of co(styrenemaleic acid), inorganic salts such as sodium chloride, potassium chloride, and sodium orthosilicate, further citric acid sulphosalicylic acid, 2,5-disulphohydroquinone, the sodium salt of ethylene-diamine tetra-acetic acid, ethanolaminodiacetic acid, the sodium salt of N(o-hydroxybenzyl)-aminodiacetic acid, the monosodium salt of vanadic acid, 3,5-disulphopyrocatechol, phosphono-acetic acid, ethylene-1,2-diphosphonic acid, butylene-1,4-diphosphonic acid, and ascorbic acid.

The coating compositions for the adhesive layer and the subbing layer can be applied successively and without drying of the first layer, to an unstretched polyester film, or to a polyester film that has been oriented by stretching in only one direction, preferably a polyester film that has been stretched longitudinally. When the two coatings have been applied to an unstretched film, the film is stretched after drying of the double layer in longitudinal and transversal direction at a temperature of 80°–90° C to 3–5 times the original dimensions. Then it is conducted through a heat-setting zone where it is heated to 180°–220° C while tension is exerted in both directions.

In the case, however, that both layers are applied to an already longitudinally stretched polyester film, the film is stretched transversally after drying of the layers, and heat-setting occurs in the same way. In both cases a fully clear and transparent polyester film is formed. Hydrophilic layers, such as gelatin-containing silver halide emulsion layers can be coated directly on the gelatin-containing layer and will tenaciously adhere to this layer. The adhesion of the hydrophilic layer to the polyester film in dry as well as in wet state during the treatment of the photographic material in the different photographic processing baths is excellent.

The advantage of the process according to the invention is manifest. If, as described hereinbefore, the coating compositions for the adhesive layer and for the subbing layer are applied immediately after each other to the polyester film support, the second layer being applied before drying of the first coated adhesive layer, only one drying zone is to be provided per film side. Moreover, both layers have to be applied before the transversal stretching anyway. At that moment the film has a width 3 to 5 times less than after the stretching operation and consequently a 3 to 5 times narrower subbing machine suffices, which is a very economical advantage, of course.

The examples hereinafter are especially directed to the use of polyethylene terephthalate film as support for the adhesive layer and the hydrophilic layer or layers. The adhesive layer may, however, be applied to other polyester films, e.g. polyesters resulting from the polycondensation of glycol, or mixtures of glycols with terephthalic acid or mixtures of terephthalic acid with minor amounts of other dicarboxylic acids such as isophthalic acid, diphenic acid, and sebacic acid.

The invention is illustrated by the following Examples.

EXAMPLE 1

A substantially amorphous polyethylene terephthalate film having a thickness of approximatively 2.2 mm was formed by extrusion of molten polyethylene terephthalate at a temperature of about 280° C on a quench drum and was chilled to a temperature of about 75° C and then stretched in the longitudinal direction over a differential speed roll stretching device to 3.5 times its initial dimension at a temperature of 84° C.

Upon the thus stretched film an adhesive layer was applied at a ratio of 75 sq.m/liter from the following coating composition:

| | |
|---|---|
| co(vinyl chloride/vinylidene chloride/ n-butyl acrylate/itaconic acid) (63:30:5:2 % by weight) as a 20 % by weight latex in water | 35 ml |
| co(ethyl acrylate/methacrylic acid) (80:20 % by weight) in the form of a 20 % by weight dispersion in water | 1.8 ml |
| water | 53 ml |

The pH of the coating composition was adjusted to 8.2 with ammonia.

The latex of co(vinyl chloride/vinylidene chloride/n-butyl acrylate/itaconic acid) was prepared by emulsion polymerization according to the method described in Example 3 of United Kingdom patent specification No. 1,234,755 by varying the respective amounts of monomers.

Immediately and without drying the adhesive layer was coated with a subbing layer at a ratio of 40 sq.m/liter from the following coating composition:

| | % by weight |
|---|---|
| gelatin (10 % aqueous solution) | 20 |
| 1,1,1-tri(hydroxymethyl)propane (10 % aqueous solution) | 10 |
| ULTRAVON W (10 % aqueous solution) | 0.5 |
| water | 69.5 |

ULTRAVON W is the trade-name of CIBA A.G., Switzerland, for a dispersing agent consisting of the disodium salt of heptadecyl-benzimidazole disulphonic acid.

The double layer was dried in a hot airstream, whereafter the film was stretched transversally to 3.5 times its original width at a temperature of about 87° C in a tenter frame. The final thickness of the film was about 0.180 mm.

The film was then conducted into an extension of the tenter frame, where it was heat-set while kept under tension at a temperature of 180° C for about 20 seconds. After heat-setting the coated film was cooled and wound up in the normal manner.

The thus heat-set film was provided with a gelatin silver halide emulsion layer as used in photograhic X-ray material. The layers of the photographic material thus obtained showed a very good adhesion to the polyester film support in wet as well as in dry state.

The adhesion in dry state was checked before and after the processing. The gelatin layer was scratched cross-wise by means of a sharp knife, whereafter an adhesive tape that had been pressed thereon was torn off at once. The quality was approved only if but very small pieces of the photographic layer were torn off.

The adhesion in wet state was checked by scratching the material superficially and trying to rub off the gelatin layer with a finger, after each step of the photographic processing (development, rinsing, fixing, rinsing). The gelatin layer should not be damaged during this rubbing.

EXAMPLE 2

The process of Example 1 was repeated with the difference that the subbing layer was applied from the following coating composition:

| | % by weight |
|---|---|
| gelatin (10 % aqueous solution) | 20 |
| 1,2,6-hexanetriol (10 % aqueous solution) | 30 |
| ULTRAVON W (10 % aqueous solution) | 0.5 |
| water | 49.5 |

After drying, stretching, and a short heat-setting treatment, a gelatin silver halide emulsion layer as used in the graphic art was applied to the subbing layer. The material showed a very good adhesion in wet as well as in dry state.

EXAMPLE 3

The longitudinally stretched polyethylene terephthalate film of Example 1 was coated with an adhesive layer at a ratio of 75 sq.m/liter from the following coating composition:

| | |
|---|---|
| co(vinylidene chloride/methyl acrylate/ itaconic acid) (88:10:2 % by weight) latex of 20 % by weight concentration | 35 ml |
| water | 65 ml |

The pH of the coating composition was adjusted to 8.1 by the addition of ammonia.

Without drying of the above adhesive layer there was immediately applied a subbing layer at a ratio of 40 sq.m/liter from the following coating composition:

| | |
|---|---|
| gelatin (10 % aqueous solution) | 20 ml |
| capralactam (10 % aqueous solution) | 20 ml |
| ULTRAVON W (10 % aqueous solution) | 0.5 ml |
| water | 59.5 ml |

After drying, stretching, and a short heat-setting treatment, a good adhesion in wet as well as in dry state was found for a graphic art's emulsion layer that was applied to the subbing layer.

EXAMPLE 4

Upon a longitudinally stretched polyethylene terephthalate film an adhesive layer was coated as in Example 1, immediately followed by a subbing layer at 60 sq.m/liter from the following coating composition:

| | |
|---|---|
| gelatin (10 % aqueous solution) | 20 ml |
| sodium salt of sulphosalicylic acid (10 % aqueous solution) | 96 ml |
| Co(butadiene/methyl methacrylate) (25:75 % by weight) as a 40 % by | |

-continued

| weight latex | 168 ml |
| ULTRAVON W (10 % aqueous solution | 5 ml |
| water | 611 ml |

After drying of the double coating in a hot air-stream, the film was stretched transversally to 3.5 times its original width and heat-set at 180° C for 15 seconds.

Gelatin silver halide emulsion layers as used in X-ray photography adhere very well to the thus subbed polyester film.

EXAMPLES 5 TO 7

The process of Example 1 was repeated with the difference, however, that the coating composition for the subbing layer waas as follows:

| In Example 5 : | gelatin | 2.5 | g |
| | glutaric acid | 1.5 | g |
| | water | 100 | ml |
| In Example 6 : | gelatin | 1.5 | g |
| | 2-sulphoethyl methacrylate | 2 | g |
| | water | 100 | ml |
| In Example 7 : | gelatin | 2 | g |
| | trimellitic acid | 1 | g |
| | water | 100 | ml |

In each case the pH of the coating composition was adjusted to 8.1 by the addition of ammonia. Excellent adhesion in dry and in wet state of gelatin silver halide emulsion layers, that were applied to the double coating, was obtained.

EXAMPLE 8

A polyethylene terephthalate film that had been stretched only in longitudinal direction as described in Example 1, was coated with an adhesive layer at a ratio of about 70 sq.m/liter with the following coating composition:

| co(vinyl chloride/vinylidene chloride/ n-butyl acrylate/itaconic acid) (63:30:5:2 % by weight) as a 20 % by weight latex in water | 350 ml |
| gelatin (10 % aqueous solution | 100 ml |
| 1,1,1-tri(hydroxymethyl)-propane | 10 g |
| water | 535 ml |
| ULTRAVON W (10 % aqueous solution) | 5 ml |

Immediately and without drying a subbing layer was applied to the adhesive layer at about 50 sq.m/liter from the following coating composition:

| gelatin | 2 g |
| 1,2,6-hexanetriol | 3 g |
| water | 100 ml |

After drying of both layers the film was stretched in transverse direction, heat-set, and provided with a gelatin silver halide emulsion layer as described in Example 1.

The adhesion in dry and in wet state afer processing in the photographic baths was excellent.

EXAMPLE 9

The process of Example 8 was repeated with the difference that the coating compositions for the adhesive layer and for the subbing layer were as follows:

| adhesive layer : | | |
| co(vinyl chloride/vinylidene chloride/ n-butyl acrylate/itaconic acid) (53:30:5:2 % by weight) as a 20 % by weight latex in water | 350 | ml |
| resorcinol | 10 | g |
| water | 645 | ml |
| ULTRAVON W (10 % aqueous solution) | 5 | ml |
| subbing layer : | | |
| gelatin | 1.5 | g |
| 2-sulphoethyl methacrylate | 2 | g |
| water | 100 | ml |

The adhesion in dry and in wet state of the gelatin silver halide emulsion layer to the subbed polyethylene terephthalate film was excellent.

We claim:

1. A process for adhering hydrophilic layers to dimensionally stable polyester film supports, which comprises applying to polyester film unstretched in at least its transverse direction an adhesive layer from an aqueous coating dispersion comprising as the dispersal phase a chlorine-containing copolymer formed of 45 to 99.5% by weight of at least one of the monomers vinylidene chloride and vinyl chloride, 0.5 to 10% by weight of an ethylenically unsaturated mono- or dicarboxylic acid or of N-vinylpyrrolidone, and 0 to 54.5% by weight of at least one copolymerizable monomer taken from acrylamides, methacrylamides, esters of acrylic acid, methacrylic acid and maleic acid, and N-alkyl maleimides; immediately applying thereto, without drying of said adhesive layer, a subbing layer from an aqueous gelatin solution containing a plasticizer for the gelatin, drying the two layers, stretching the thus-coated polyester film support to biaxially orient the same at a temperature up to about 90° C., heat-setting the stretched coated support, and applying to the subbing layer a hydrophilic layer.

2. A process according to claim 1, wherein the polyester film is a film of a polyethylene terephthalate.

3. A process according to claim 1, wherein the chlorine-containing copolymer is a copolymer of vinylidene chloride, vinyl chloride, n-butyl acrylate, and itaconic acid (63:30:5:2 % by weight).

4. A process according to claim 1, wherein the chlorine-containing copolymer is a copolymer of vinylidene chloride, methyl acrylate and itaconic acid (88:10:2 % by weight).

5. A process according to claim 1, wherein said plasticizer is taken from 1,1,1-tri(hydroxymethyl)-propane, 1,2,6-hexanetriol, caprolactam, glutaric acid, trimellitic acid, resorcinol, 2-sulphoethyl methacrylate, and the latex of a copolymer of butadiene and methyl methacrylate (25:75 % by weight).

6. A process according to claim 1, wherein the hydrophilic layer applied to the subbing layer is a light-sensitive gelatin silver halide emulsion layer.

* * * * *